United States Patent [19]

Asano et al.

[11] 3,707,891
[45] Jan. 2, 1973

[54] HYDRAULIC CONTROL SYSTEM FOR TRANSMISSION OF VEHICLE

[75] Inventors: Tadao Asano; Noboru Murakami, both of Kariya-shi, Japan

[73] Assignee: Aisin Seiki Kabushiki Kaisha, Kariya-shi, Aichi-ken, Japan

[22] Filed: Feb. 16, 1971

[21] Appl. No.: 115,301

[30] Foreign Application Priority Data

Feb. 16, 1970 Japan..................................45/13326

[52] U.S. Cl. ...............74/869, 74/DIG. 1, 192/109 F
[51] Int. Cl.........................B60k 21/02, B60k 29/00
[58] Field of Search.........74/867, 868, 869, 864, 753; 192/109 F

[56] References Cited

UNITED STATES PATENTS

| | | | |
|---|---|---|---|
| 2,711,656 | 6/1955 | Smirl | 74/864 |
| 2,769,350 | 11/1956 | Lucia et al. | 74/869 |
| 3,101,011 | 8/1963 | Tuck et al. | 74/868 X |
| 3,230,791 | 1/1966 | Kelley et al. | 74/864 |
| 3,274,848 | 9/1966 | Konrad et al. | 74/869 X |
| 3,570,328 | 3/1971 | Kogaki | 74/867 |

Primary Examiner—Milton Kaufman
Assistant Examiner—Thomas C. Perry
Attorney—Berman, Davidson & Berman

[57] ABSTRACT

Disclosed herein is a hydraulic control system for a transmission of a vehicle having a driving engine. The control system comprises a drive shaft driven by the engine, a driven shaft, means for providing multi-ratio power trains between the drive shaft and driven shaft and having friction engaging device for completing the power trains when engaged, the device including servo-means for engagement thereof, a source of fluid pressure, a line pressure conduit for connecting the pressure source to the servo-means, pressure regulating means for controlling line pressure within the conduit to and from a high value and a low value, manual selector means for selectively connecting the line pressure to the servo-means, flow regulating means for regulating fluid pressure supplied into the servo-means, sensing means for controlling operation of the pressure regulating means in response to a fluid pressure into the servo-means through the flow regulating means and the line pressure, for thereby eliminating possible and positive shocks in shifting down the power trains through the transmission.

6 Claims, 8 Drawing Figures

INVENTORS
TADAO ASANO,
NOBORU MURAKAMI,

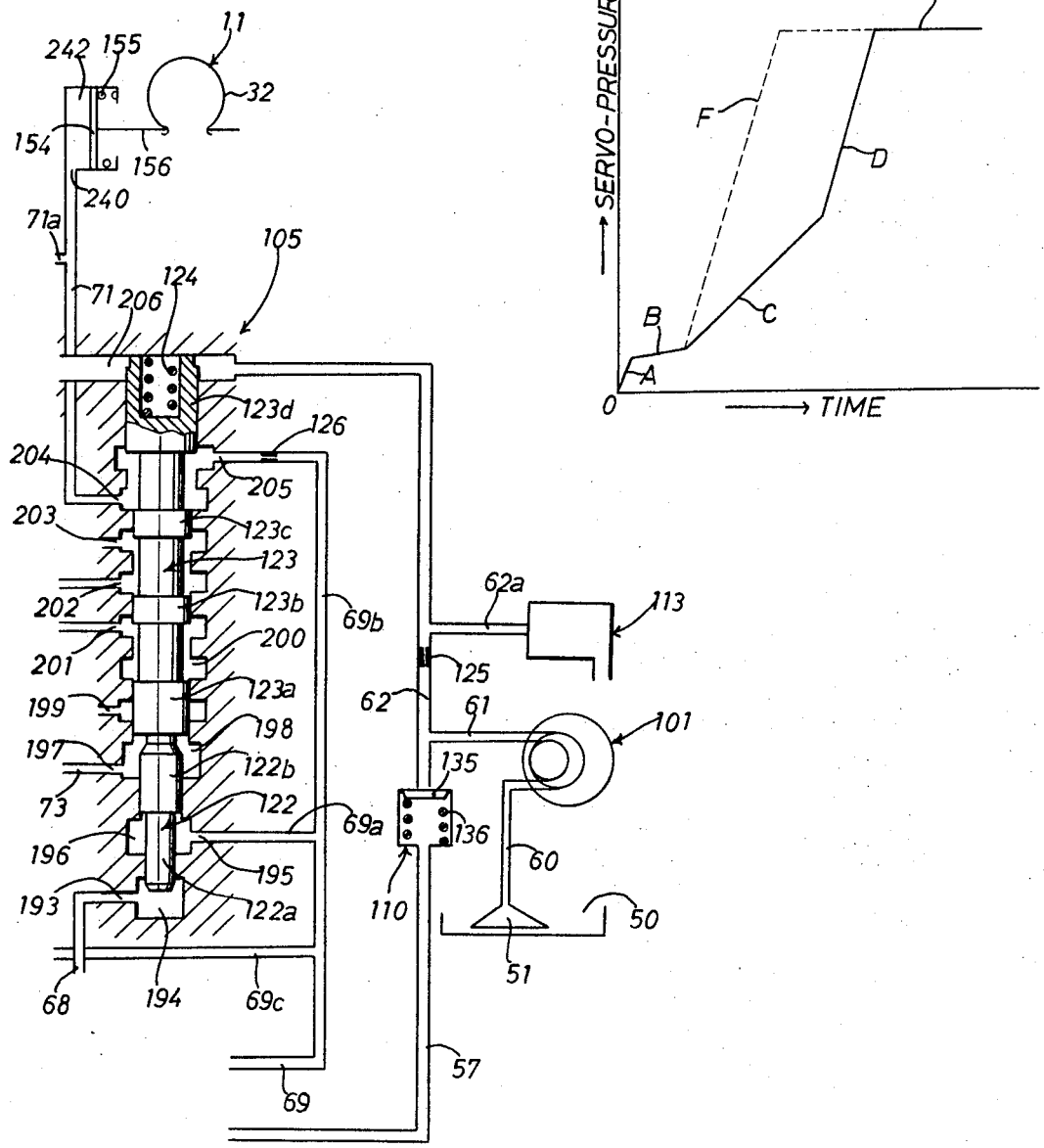

HYDRAULIC CONTROL SYSTEM FOR TRANSMISSION OF VEHICLE

The present invention relates to an automatic transmission for automotive vehicles, and more particularly to an improvement in the hydraulic control system for the transmission.

To obtain multi-ratio power trains, heretofore, a hydraulically operated automatic transmission of the conventional type has comprised a planetary gear set connected to a driven shaft and frictional engagement mechanism to transmit torque from the prime engine of the vehicle to the gear set through a torque convertor, the frictional engagement mechanism including hydraulic frictional clutch means and brake means. It has been well known that line pressure to produce engagement of the frictional engagement mechanism should better be high in the low speed ratio power train for thereby transmitting high torque and low in the high speed ratio power train since rather low torque is required. It has also been well noted that an rapid increase of the line pressure should better be prevented when it acts on the servo-motors of the frictional engagement mechanism since when the mechanism is connected to engine torque suddenly, undesired and unpleasant shocks happen. And on the other hand, when the line pressure increases slowly, there happens slips within the frictional engagement mechanism to give unpleasant feeling and irritating fear to the driver of the vehicle. Several control devices and systems have been introduced to regulate the line pressure in the mentioned type of the transmission. They are all, however, far from being perfect.

A first important object of the present invention is, therefore, to provide a hydraulic control system for a transmission through which selected power trains can be shifted down automatically and manually with undesired and unpleasant shocks eliminated by lowering the line pressure before the frictional engaging mechanism engages and raising the line pressure after completion of the engagement of the frictional engaging mechanism.

A second important object of the present invention is to provide a hydraulic control system having above mentioned characteristics, wherein slips in the frictional engaging mechanism when shifted down can well be eliminated for thereby giving no irritating fear to the driver of the vehicle.

A third important object of the present invention is to provide a hydraulic control system having the above mentioned characteristics, wherein proper fluid pressure is always provided for smooth completion and sure maintenance of intermediate and high speed ratio power trains through the transmission for providing the driver of the vehicle with assured and pleasant drive.

A further important object of the present invention is to provide means for a hydraulic control system having the above mentioned characteristics, which is capable of controlling in desired timing the line pressure to and from the high and low values respectively predetermined at approximate values.

A still further important object of the present invention is to provide a hydraulic control system having the above mentioned characteristics, wherein simple constructions and easy arrangement of the line pressure controlling means promise smooth and durable performance of the transmission.

Other objects and features of the present invention will be more clear in the following description of one preferred embodiment, especially when read together with the accompanying drawings, in which;

FIG. 3A, 3B, 3C and 3D show individually in detail the important portions the hydraulic control systems illustrated in FIG. 2. When these figures are arranged in the corresponding positions as shown in FIG. 3, a detailed complete view of the hydraulic control system for the transmission illustrated in FIG. 1 may be formed up.

FIG. 4 indicates a curve of increases of the fluid pressure obtained within the servomotors for the frictional engagement mechanism through the present invention.

Like characters of reference designate like parts in the several views.

Figure 1:
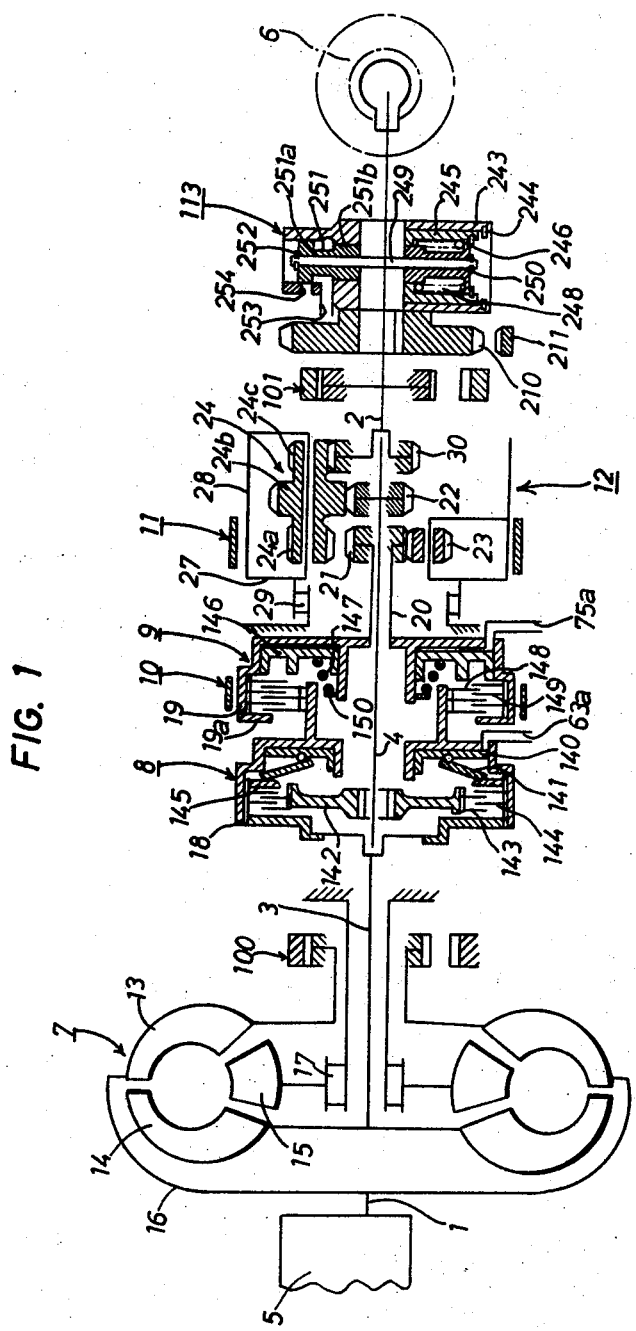
FIG. 1 is a schematic view of an elevational section of the transmission to which the present invention is adopted.

Referring now in particular to FIG. 1, the transmission may be seen to comprise a drive shaft 1, a driven shaft 2 and intermediate shafts 3 and 4. The drive shaft 1 may be the usual crankshaft of a vehicle engine 5, and the shaft 2 may be connected by any suitable means (not shown) with the driving road wheels of the vehicle. All of the shafts 1, 2, 3 and 4 are rotatably disposed with respect to the transmission housing and the intermediate shafts 3 and 4 are in effect piloted with respect to the shafts 1 and 2. The transmission comprises in general, a hydraulic torque converter 7, hydraulically operated front and rear friction clutches 8 and 9, hydraulically operated front and rear friction brakes 10 and 11 and a planetary gear set 12.

The hydraulic torque converter 7 comprises a pump impeller element 13, a turbine runner element 14 and a vaned stator or reaction element 15. The elements 13, 14 and 15 are disposed within a fluid tight casing. The impeller element 13 is driven from the drive shaft 1 through a drive plate 16 fixed to the drive shaft 1. The turbine runner element 14 is splined to the intermediate shaft 3. The stator 15 is rotatably disposed on a stationary sleeve which is fixed to the transmission housing, and a one-way brake 17 is disposed between the stator 15 and the sleeve. The one-way brake 17 is so arranged as to allow a free rotation of the stator 15 in the forward direction, that is in the same direction in which the drive shaft 1 rotates and prevents a rotation of the stator 15 in the reverse direction.

The front clutch 8 is arranged to connect the intermediate shaft 3 driven by the turbine runner element 14 with the intermediate shaft 4 and first sun gear 22 formed thereon. The front clutch 8 comprises friction discs 143 splined onto a hub member 142 which in turn is splined on the shaft 4. The clutch 8 also comprises friction discs 144 interleaved between the friction discs 143 and splined within a clutch drum 18 connected to the intermediate shaft 3 and rotatably disposed on the shaft 4.

The front clutch 8 comprises a movable pressure plate 145 splined within the clutch drum 18 and adapted to press the friction discs 143 and 144 together in frictional engagement between it and the clutch drum 18 which acts as a pressure member on the other side of the discs. An annular piston 140 is provided for actuating the movable pressure plate 145 and is slidably disposed within an annular cavity provided in the clutch drum 18. Pressure from the piston 14 is transmitted to the pressure plate 145 through a dish spring 141 which is in the form of a ring and is held in place within the clutch drum 18. The resilient action of the dish spring 141 functions to return the piston 140 back when fluid pressure applied as will be hereinafter described is released from the piston 140.

The rear clutch 9 is arranged to connect the clutch drum 18 and thereby the intermediate shaft 3 with a clutch drum 19, a sleeve member 20 fixed to the clutch drum 19 and a second sun gear 21 and comprises friction discs 148 splined onto the clutch drum 18 and friction discs 149 splined within the clutch drum 19. A pressure plate 19a is fixed with the clutch drum 19 on one side of the clutch discs 149, and an annular piston 146 is provided on the other side of the discs and within a similarly shaped cavity formed in the drum 19 for compressing the discs between it and the pressure plate 19a. A coiled return spring 147 is provided for holding the piston 146 in its illustrated clutch releasing position. The spring 147 is disposed between the piston 146 and a spring retainer collar 150 fixed on the drum 19.

The planetary gear set 12 comprises the first sun gear 22 which is splined on the intermediate shaft 4, the second sun gear 21 formed on the sleeve member 20 which is rotatable on the shaft 4, a planet gear 24 including a gear portion 24a, 24b and 24c, a planet gear 23, a third sun gear 30 and a planet gear carrier 27. The planet gear 24 and the planet gear 23 are rotatably disposed in the gear carrier 27. The gear carrier 27 is rotatably disposed within the transmission housing through a one-way clutch 29 interposed between a brake drum 28 and the housing, the gear carrier 27 formed in a piece with the brake drum 28. The one-way brake 29 is so arranged as to allow a free rotation of the carrier 27 in the forward direction, that is in the same direction in which the drive shaft 1 rotates and prevents a rotation of the carrier 27 in the reverse direction. The portion 24b of the planet gear 24 is in mesh with the sun gear 22. The planet gear 23 is in mesh with the second sun gear 21 and the portion 24a of the planet gear 24. The third sun gear 30 is in mesh with the portion 24c of the planet gear 24 and connected to the driven shaft 2.

The front friction brake 10 comprises a brake band 31 adapted to be contracted on the drum portion of the clutch drum 19 for thereby braking the sun gear 21. The rear friction brake 11 comprises a brake band 32 adapted to be contracted on the brake frum 28 for thereby braking the gear carrier 27. For the brake bands 31 and 32 of the front and rear friction brakes 10 and 11, FIGS. 3C and 3D are referred to.

In operation, the above mentioned transmission provides low, intermediate and high speed ratios in forward drive and a ratio in reverse drive. And neutral and parking-brake conditions are also obtainable.

The low speed forward drive is available in the following low speed ratio power train, but is intended only for such emergency uses as to drive the vehicle through sand, mud, snow or up steep slopes, when great torque becomes necessary, or to use the power train for the engine braking effect in descending steep slopes to prevent vapor lock of the fluid brake system of the road wheels which would cause disastrous results.

The low speed ratio power train may be completed by engaging the front clutch 8 and the rear brake 11, which makes the intermediate shaft 3 drive the intermediate shaft 4 to thereby drive the first sun gear 22, a main driving element for the planetary gear set 12. The driving torque is then transmitted from the first sun gear 22 to the third sun gear 30 through the portions 24b and 24c of the planet gear 24 and the driven or output shaft 2 is driven at a reduced speed with respect to the intermediate shaft 4. The changes in torque are made within the torque convertor 7 and the planetary gear set 12, thus the driving torque value for the driven shaft 2 falls on the product of the torque ratios within the torque convertor 7 and the planetary gear set 12.

The intermediate speed ratio power train is obtained by engaging the front clutch 8 and the front brake 10 and also disengaging the rear brake 11 with respect to the completion of the low speed ratio power train. The torque is transmitted in the same route as in the case of the low speed drive, but now the front brake 10 is effective to hold the second sun gear 21 stationary which constitutes the reaction element of the planetary gear set 12 instead of the gear carrier 27. The intermediate speed ratio power train exists from the drive shaft 1 to the driven shaft 2 through the intermediate shaft 3, the front clutch 8, the intermediate shaft 4, the first sun gear 22 rotating in a piece with the intermediate shafts 3 and 4, the planet gear 24 of which the portions 24b and 24c are respectively in mesh with the first sun gear 22 and the third sun gear 30, and the third sun gear 30 to rotate in a piece with the driven shaft 2. At the same time, the portion 24a of the planet gear 24 is in mesh with the planet gear 23 held on the gear carrier 27 which also holds the planet gear 24, the planet gear 23 being in mesh with the second sun gear 21. The second sun gear 21 being held stationary by the front brake 10, the gear carrier 27 rotates in the forward direction. The driven shaft 2 is thus driven at a reduced speed in respect to the intermediate shaft 4, the reduced ratio is less than that for the low speed ratio power train.

The high speed ratio power train can be completed by engaging the rear clutch 9 and disengaging either of the front or rear brakes 10 or 11, allowing the front clutch 8 to remain engaged. The rear clutch 9 may be engaged by applying fluid pressure to the piston 146. In this drive, too, the first sun gear 22 is driven through the front clutch 8 as in case with the low and intermediate speed ratio power trains. The rear clutch 9 functions to connect the clutch drum 18 in communication with the intermediate shaft 3 to the second gear 21 by way of the clutch drum 19. Thus both of the second sun gear 21 and the first sun gear 22 are driven by the intermediate shaft 3, and as is well known in connection with planetary gear sets, when two elements of the gear set 12 are driven at the same speed, the gear set 12 becomes locked up so that all of its gears and elements rotate as a unit, which constructs a substantially direct drive between the intermediate shaft 3 and the driven shaft 2. At this moment, the torque convertor 7 is in its non-torque-converting condition, functioning as a simple fluid coupling. Thus, a substantially direct drive exists between the drive shaft 1 and the driven shaft 2 in this particular power train.

Reverse drive is obtained through the transmission by engaging the rear clutch 9 and the rear brake 11. In this drive the power train exists from the drive shaft 1 to the driven shaft 2 through the torque convertor 7, the intermediate shaft 3, the portions 24a and 24c of the planet gear 24, and the third sun gear 30. The rear brake 11 in engagement causes the gear carrier 27 to work as the reaction element of the gear set 12, the reaction onto the gear carrier 27 being in the forward direction. Since there are the two planet gears 23 and 24 between the second sun gear 21 to drive and the third sun gear 30 to be driven, the third sun gear 30 and the driven shaft 2 will be driven at a reduced speed in the reverse direction with respect to the intermediate shaft 3 in accordance with well known principles of operation of the planetary gear sets. In this drive, the torque convertor 7 generally functions to increase torque, and the torque impressed on the driven shaft 2 is the product of the torque increases by the torque convertor 7 and the planetary gear set 12.

The neutral condition of the transmission is obtained, as illustrated in FIG. 1, by disengaging the front and rear clutches 8 and 9 and also the front and rear brakes 10 and 11. As well shown in FIG. 3C, the brake 10 engages when fluid pressure acts on a piston 151 in a brake actuating pressure chamber 236, which pushes a piston rod 153 to engage the brake band 31 with the clutch drum 19. In the other side of the piston 151 there is provided a brake releasing pressure chamber 239 in which a spring 152 is stretched to release the brake band 31. Thus, when fluid pressure acts in the pressure chamber 239, the spring 152 returns the piston 151 to release the front brake 10 against the fluid pressure within the chamber 236. The rear brake 11 operates, as well shown in FIG. 3D, to engage the brake band 32 with the brake drum 28 when fluid pressure acts in a brake actuating pressure chamber 242 to push a piston 154 and a piston rod 156 against a spring 155. The brake releasing operation is completed in the same process as in the front brake 10.

A parking brake 211 is provided to brake the driven shaft 2 of the vehicle so as to maintain the vehicle in its stationary condition and to prevent the vehicle from being pushed or rolled down descending slopes. The parking brake effect is obtainable by engaging the parking brake 211 with an outer gear 210 keyed on the driven shaft 2, which prevents the driven shaft 2 from rotating in both of the forward and reverse directions.

Figure 2:
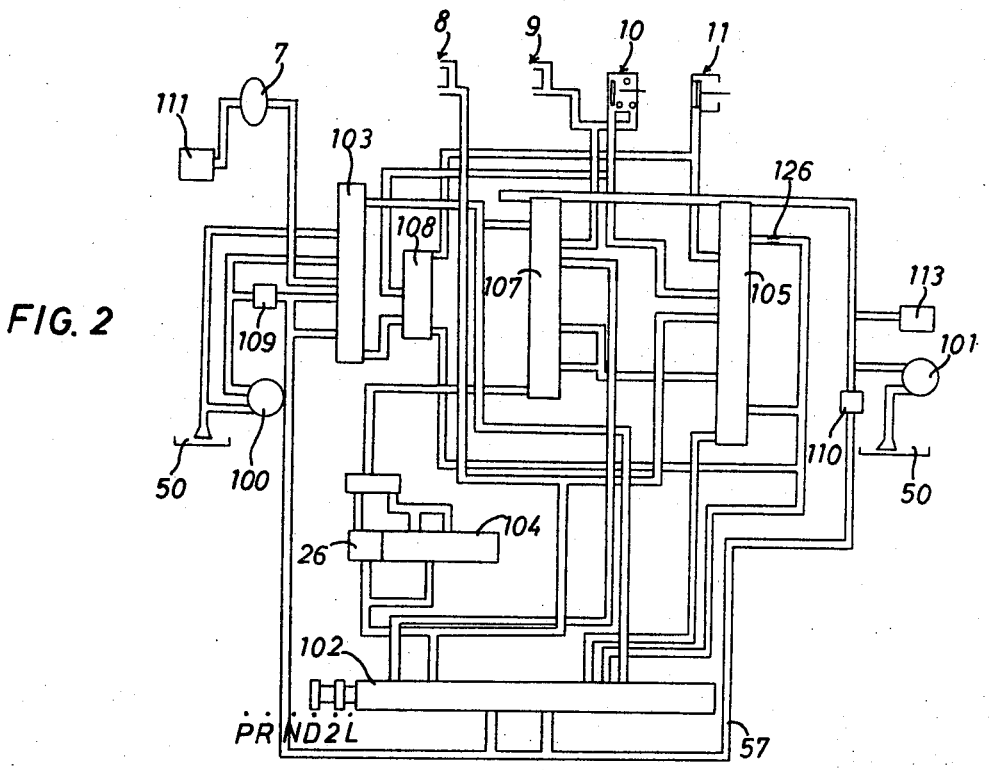
FIG. 2 shows the hydraulic control system for the transmission illustrated in FIG. 1.

So as to determine a drive power train, a manual selector lever (not shown) is provided in the cab of the vehicle which has such positions as "P," "R," "N," "D," "2," and "L" corresponding respectively with "Parking Brake," "Reverse," "Neutral," "Drive Range," "Second Range" and "Low Range" conditions of the transmission and of the hydraulic control system, as will be hereinafter described further in detail. These positions are in relative connection with the corresponding positions of a manually operated selector valve 102 hereinafter designated as a manual selector valve which is best depicted in FIG. 2 and 3B.

Shifting the manual selector valve 102 to any desired position through the manual selector lever provides the desired condition of the transmission and the hydraulic control system; in the "P" position, parking brake effect is obtained, in the "N" position, the neutral condition, and in the "R" position, the reverse ratio power train. Then, in the "L" position, generally the low speed ratio power train is obtained and also when the position is shifted to the "L" position while the vehicle is running at a high speed, the intermediate speed ratio power train is obtained, the obtained intermediate speed ratio power train changes into the low speed ratio power train as the speed of the vehicle decreases. The low or intermediate speed ratio power trains are obtainable in accordance with pressure of governer and throttle valves. When the manual selector valve 102 is in the "D" position, the vehicle starts with the intermediate speed ratio power train under a low throttle pressure and the power train is automatically shifted to the high speed ratio in response to the speed increase of the vehicle. The automatic shift of the speed ratio power trains is made in the reverse way when the speed of the vehicle decreases. Under intermediate or high throttle pressures, the low, intermediate and high speed ratio power trains are interchangable automatically in accordance with the changes of the speed of the vehicle.

As described above, the low speed ratio power train is obtainable when the speed of the vehicle is low with the manual selector valve 102 in its "L" or "2" positions and also in its "D" position in case of the intermediate or higher throttle pressure. In this case, no other speed ratio power train is obtained with the manual selector valve 102 in the "L" position. The low speed ratio power train is completed with the manual selector valve 102 in its "L" position by engaging the front clutch 8 and the rear brake 11, both engagements made by applying fluid pressure respectively to the piston 140 and the piston 154. The low speed ratio power train in this case is realized in a two-way drive. The low speed ratio power train with the manual selector valve 102 in the "2" and "D" positions is completed merely by engaging the front clutch 8 when the piston 140 is actuated by fluid pressure, the one-way brake 29 taking place of the rear brake 11 mentioned in the above. The low speed ratio power train in this case is a one-way drive.

The one-way brake 29 has the following function; when the manual selector valve 102 is shifted from the "L" position to the "2" of "D" position while the vehicle is running, the rear brake 11 is disengaged and the front brake 10 or the rear clutch 9 engages to complete the intermediate or high speed ratio power train. During this shifting, a delay is apt to happen, then prior to the engagement of the front brake 10 or the rear clutch 9, the rear brake 11 disengages to thereby let the engine 5 accelerate. This causes terrible shocks as the front brake 10 or the rear clutch 9 engages. Thus, the one-way brake 29 is arranged to take over the role of the rear brake 11 when the rear brake 11 disengages and to prevent the acceleration of the engine 5 till the front brake 10 or the rear clutch 9 engages. The one-way brake 29 functions to prevent the gear carrier 27 from rotating in the reverse direction of the engine rotation as the rear brake 11 does in the low speed ratio power train. After the front brake 10 or the rear clutch 9 engages, the gear carrier 27 rotates in the forward direction which is same as the rotation direction of the engine 5. Then, the one-way brake 29 disengages at a suitable moment to realize smooth shifting of the power train from the low speed ration to the intermediate or high speed ratio.

The intermediate speed power train is obtainable when the manual selector valve 102 is placed in the "2" and "D" positions while the vehicle speed and the throttle pressure stay within certain degrees, or when the manual selector valve 102 is shifted to the "L" position while the vehicle runs with the high speed ratio power train.

The high speed ratio power train is obtained when the vehicle runs at a sufficiently high speed with the manual selector valve 102 in the "D" position.

As now well understood, the power train is shifted down to the low speed ratio when the speed of the vehicle decreases with the manual selector valve 102 in one of the "L" and "2" and "D" positions. The power train is automatically shiftable to the intermediate ratio when the manual selector valve 102 is placed either in the "2" or "D" position, but no shifting of the power train can be made when the manual selector valve 102 is in the "L" position.

The relative engagement and disengagement of the front clutch 8, the rear clutch 9, the front brake 10, the rear brake 11 and the one-way brakes 29, which are heretofore described in detail, may be concisely summarized in the chart that follows. In the chart, the symbol of "X" means engagement of the indicated friction device, meanwhile the symbol of "O" indicates disengagement.

|  |  | Front clutch (8) | Rear clutch (9) | Front brake (10) | Rear brake (11) | One-way brake (29) |
|---|---|---|---|---|---|---|
| Neutral |  | 0 | 0 | 0 | 0 | 0 |
| L-range | Low | X | 0 | 0 | X | (X) |
| 2nd-range | Low | X | 0 | 0 | 0 | X |
|  | 2nd | X | 0 | X | 0 | 0 |
| D-range | Low | X | 0 | 0 | 0 | X |
|  | 2nd | X | 0 | X | 0 | 0 |
|  | High | X | X | 0 | 0 | 0 |
| Reverse |  | 0 | X | 0 | X | 0 |

Figure 3:
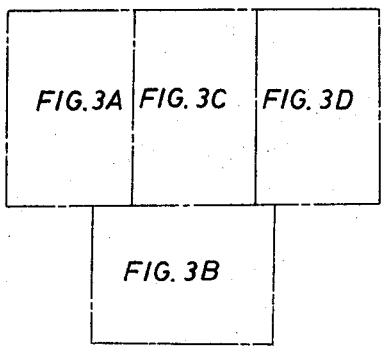
FIG. 3 is a diagram indicating the relative positions of separated portions of the hydraulic control system drawn in FIGS. 3A through 3D.
Figure 3A:
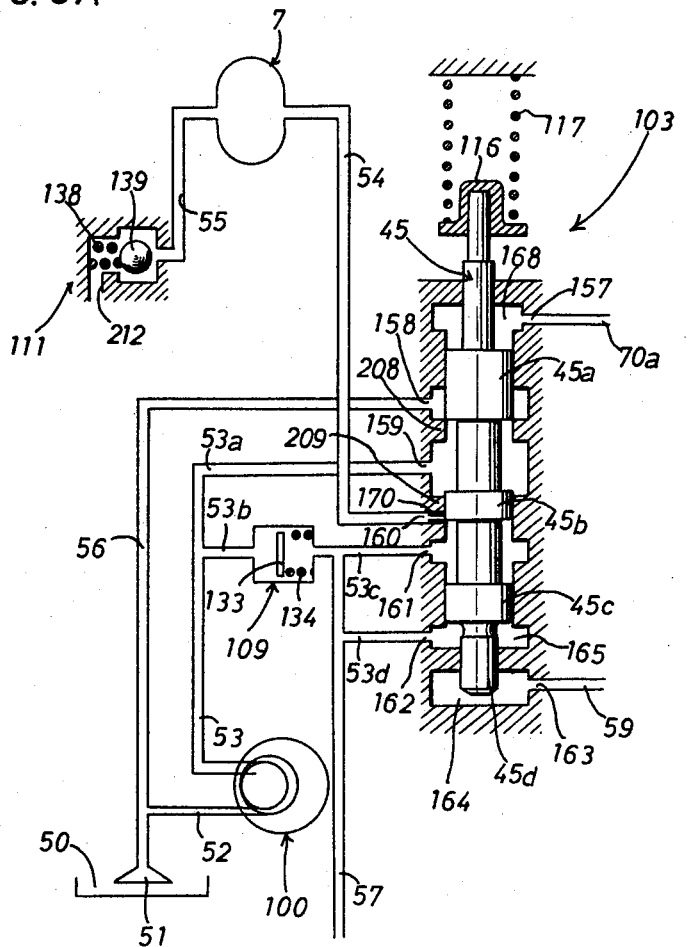
Figure 3B:
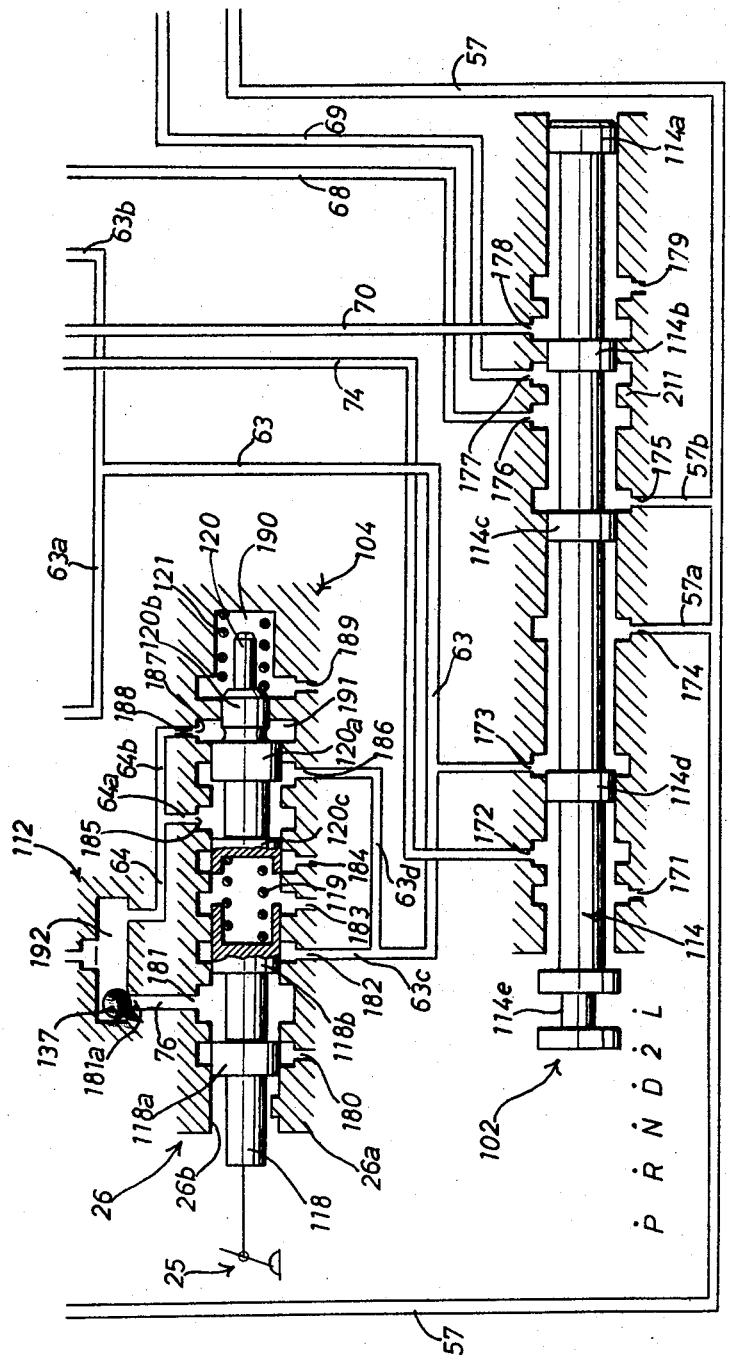
Figure 3C:
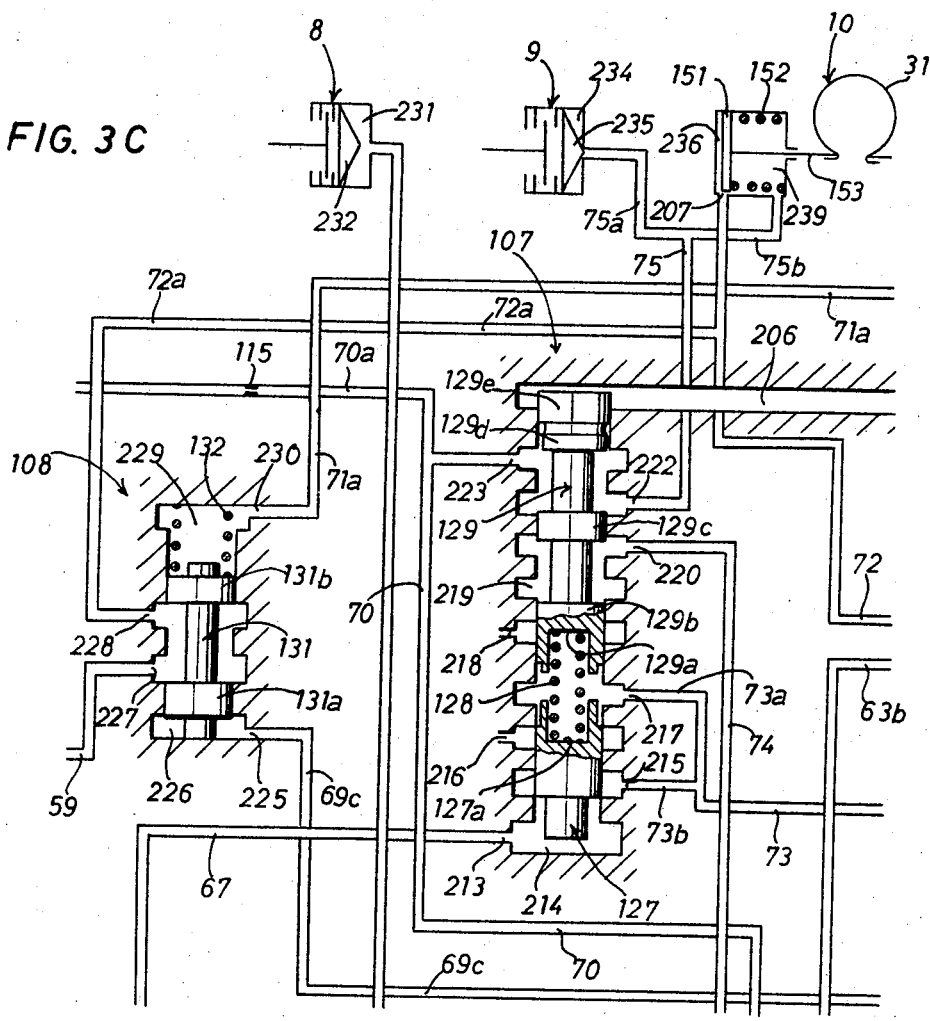

Referring now to FIG. 2 for the over-all disposition of the construction portions, FIG. 3 for the relative positions of the construction portions shown in FIG. 3A to 3D, and FIG. 3A–3D for the details of the construction portions, the hydraulic control system for the transmission in accordance with the present invention comprises generally a front pump 100 driven by the pump impeller element 13 and a rear pump 101 driven by the driven shaft 2 which together provide a source of hydraulic pressure, the rear pump 101 functioning to make the front pump 100 inoperative and to supply pressurized fluid to the system above a certain speed of the vehicle; one-way check valves 109 and 110 disposed within a line pressure conduit 57 connecting discharge ports of the front and rear pumps 100 and 101 to each other so as to secure operation of the two pumps 100 and 101 as well as to perform switching-over operation of the two pumps 100 and 101 at and above a certain speed of the vehicle, the front pump 100 supplying the flow of pressurized fluid in one direction while the rear pump 101 allowing the pressurized fluid to flow in the other direction; a pressure regulator valve 103 for regulating the fluid pressure from either of the pumps 100 or 101 approximately at a preset value; the manual selector valve 102 described above for conditioning the transmission to operate in different power trains by shifting fluid pressure passages leading respectively to servomoters of the front clutch 8, the rear clutch 9, the front brake 10 and the rear brake 11, the displacement of the manual selector valve 102 being carried out through the manual selector lever (not shown) provided in the cab for the desired operation of the driver of the vehicle; a throttle valve 104 for providing a throttle pressure which increases in accordance with actuation onto or depression of a vehicle accelerator 25, the line pressure applied on the manual selector valve 102; a downshift valve 26 for controlling the throttle valve 104; a governor valve 113 for providing a fluid pressure or a governor pressure in response with a revolution number of the driven shaft 2 or a speed of the vehicle, the governor valve 113 taking in the fluid pressure discharged from the rear pump 101; a first to second ratio shift valve 105 hereinafter designated as a 1–2 shift valve which is controlled by pressure differences between the throttle and governor pressures so as to regulate engagement and disengagement of the front brake 10 and the rear brake 11, that is to make selection between the first speed and second speed ratio; a second to third ratio shift valve 107 hereinafter designated as a 2–3 shift valve which is controlled by the throttle and governor pressures so as to select the second speed ratio or the third speed ratio, in other words, to control engagement and disengagement properly for either of the front brake 10 or the rear clutch 9; a reducing valve 108 to regulate the fluid pressure delivered to a reducing chamber of the regulator valve 103 in response to pressure differences between the line pressure and the engaging fluid pressure for the front brake 10 or the rear brake 11; and flow regulating means 126 such as an orifice in the illustrated embodiment provided within a conduit 69b for reducing fluid pressure delivered to the servomotor for the rear brake 11 through the 1–2 shift valve 105 as best shown in FIG. 3D. It should be clearly pointed out that provision of the reducing valve 108 and the flow regulating means 126 is the most important subject matter to complete the present invention.

Described below in greater detail are the above-mentioned hydraulic elements and mechanisms including their construction and operation. The front pump 100 may be of any suitable construction designed to discharge a certain predetermined amount of operation fluid in an unit period of time, and in the preferred embodiment comprises an inner gear in mesh with an eccentric outer gear. The inner gear is so connected as to be driven by the pump impeller element 13 of the torque convertor 7. The front pump 100, draws operation fluid from a operation fluid reservoir 50 through a filter 51 and an inlet conduit 52 and discharges it into an outlet conduit 53.

The rear pump 101 is similar in construction to the front pump 100, but designed to have a smaller discharging quantity than the front pump 100. The rear pump 101 includes an inner gear in mesh with an eccentric outer gear, and the inner gear is driven by the driven shaft 2 so as to make the rear pump 101 effective to pump operation fluid from the reservoir 50 through the filter 51 and an inlet conduit 60 to a discharge conduit 61. Disposed behind the rear pump 101 on the driven shaft 2 are the governor valve 113 and the outer gear 210 to complete the parking brake condition of the transmission.

The one-way check valve 110 is interposed between the line pressure conduit 57 and the discharge conduit 61, the line pressure conduit 57 being arranged to supply operation fluid to the servomotors for front and rear clutches 8 and 9 and the front and rear brakes 10 and 11 for thereby securing the different forward speed ratio power trains and a reverse drive. The one-way check valve 110 comprises in its illustrated form a valve element 135 urged resiliently by a spring 136 for closing normally the one-way check valve 110, which, in turn, prevents the operation fluid within the line pressure conduit 57 from flowing into the discharge conduit 61 and the rear pump 101.

The similar one-way check valve 109 is disposed in the line pressure conduit 57 to control the flow of operation fluid from the front pump 100, the one-way check valve 109 also including a valve element 133 and a spring 134 urging the valve element 133.

The pressure regulator valve 103 to regulate fluid pressure within the line pressure conduit 57 comprises a spool 45 slidably disposed within a housing having a cylindrical bore. The spool 45 comprises lands of a diameter 45a, 45b and 45c and a land 45d of a smaller diameter, the lands 45a, 45b, 45c and 45d being in sliding contact with the wall of the cylindrical bore of the housing as best shown in FIG. 3A. A spring 117 normally urges the spool 45 downward through a spring retainer 116. The cylindrical bore of the housing has ports 157, 158, 159, 160, 161, 162 and 163 in connection therewith.

The ports 161 and 162 are connected to the line pressure conduit 57 respectively through branch conduits 53c and 53d. The port 159 is connected to a branch conduit 53a in connection with the outlet conduit 53 of the front pump 100, and the port 158 is also connected to a conduit 56 which is then connected to the inlet conduit 52 of the front pump 100. The port 160 is provided with an orifice 170 therein and is connected to a conduit 54 which extends to the torque convertor 7. A proper size of the orifice 170 enables to supply a desired value of fluid pressure to the torque convertor 7.

The governor valve 113 constituting a hydraulic governor comprises a housing 243 disposed and fixed on the driven shaft 2, a spool 251, an inner weight 246 and an outer weight 245 slidable within the cylindrical bore of the housing 243, the cylindrical bore provided to cross the driven shaft 2 at a right angle, and a spring 248 stretched effectively between the inner and outer weights 246 and 245. The inner and outer weights 246 and 245 and the spool 251 are so arranged to exist in both sides of the driven shaft 2, and are prevented from making outer displacement by means of a bar 249 and C rings 250 and 252. The spool 251 is provided with lands 251a and 251b of different diameters thereon. The housing 243 of the governor valve 113 has ports 253 and 254, the port 254 being an outlet port which is connected with the reservoir 50, and the port 253 being connected to the discharge conduit 61 of the rear pump 101 through a conduit 62a and a conduit 62 provided with an orifice 125.

The throttle valve 104 includes a housing having a cylindrical bore, a spool 120 slidably engaged within the bore and provided with lands 120a and 120c of a diameter and a land 120b of a smaller diameter, a spring 119 stretched between the spool 120 and a spool 118 of the downshift valve 26 hereinafter described in detail, and a spring 121 disposed in the right side of the spool 120 in FIG. 3B as the reaction element against the spring 119. The cylindrical bore has ports 183, 184, 185, 186, 187 and 189. The ports 183, 184 and 189 constitute exhaust ports. The port 186 is in communication with a branch conduit 63d which in turn is connected to a conduit 63 extending at one end thereof to a port 173 of the manual selector valve 102 hereinafter described in detail. An orifice 188 is provided within the port 187 which is in connection with the port 185 through a branch conduit 64b and a conduit 64a. The branch conduits 64b and 64a are then connected to a conduit 64 which is further in connection with a check ball chamber 192 of a check valve 112. The check ball chamber 192 is connected to a chamber 214 of the 2–3 shift valve 107 through a conduit 67 and a port 213 of the 2–3 shift valve 107.

The downshift valve 26 comprises the spool 118 provided with lands 118a and 118b and slidably engaged within a cylindrical bore 26b of a housing 26a. The cylindrical bore 26b has ports 180, 181 and 182 provided in the wall of the cylindrical bore 26b. The port 182 is in communication with the port 173 of the manual selector valve 102 through a branch conduit 63c and the conduit 63. The port 18 is an exhaust port, and the port 181 is connected to a port 181a of the check valve 112 through a conduit 76 and then to the port 213 of the 2–3 shift valve 107 through the checkball chamber 192 and the conduit 67. The spool 118 is connected to the accelerator 25 by suitable connecting means so that depression of the accelerator 25 moves the spool 118 rightward in FIG. 3B. The accelerator 25 is also connected to a carburetor (not shown) for the engine 5 of the vehicle through suitable connecting means.

The 2–3 shift valve 107 comprises spools 127 and 129 slidably engaged within a cylindrical bore of a housing and a spring 128 interposed between the spools 127 and 129 to urge the spools 127 and 129 in opposite directions with respect to each other. The spool 127 has a spring retainer 127a for the spring 128 at one end thereof. The spool 129 comprises lands 129b, 129c and 129e of a diameter, and a land 129d of smaller diameter than that of the lands 129b, 129c and 129e. The housing includes ports 213, 215, 216, 217, 218, 220, 222 and 223 and also chambers 206, 214 and 219.

The ports 216 and 218 constitute exhaust ports lead to the reservoir 50. The port 213 is in communication with the conduit 67 which in turn is connected to the check valve 112, and the connection further extends from the check valve 112 to the conduit 64 and to the ports 185 and 187 of the throttle valve 104 respectively through the branch conduits 64a and 64b. The ports 215 and 217 are connected to a conduit 73 respectively by way of branch conduits 73b and 73a. The chamber 219 is a mere groove made for convenience in completing the cylindrical bore of the housing. The port 220 is connected to a port 172 of the manual selector valve 102 through a conduit 74. The port 222 is connected to an actuating pressure chamber 234 of the servomotor for the rear clutch 9 through a conduit 75 and a branch 75a, and also connected to the releasing pressure chamber 239 of the servomotor for the front brake 10 through the conduit 75 and a branch conduit 75b. The port 223 is connected to a port 178 of the manual selector valve 102 through a conduit 70 which is also connected to the port 157 and to a chamber 168 of the pressure regulator valve 103.

The 1-2 shift valve 105 is so designed to function to disengage the rear brake 11 when the front brake 10 engages and to disengage the front brake 10 when the rear brake 11 engages so that the changes between the first and second speed ratio conditions of the transmission may be obtained. Reference is made to FIG. 3D, wherein as illustrated the 1-2 shift valve 105 comprises a housing, spools 122 and 123 slidably engaged within a cylindrical bore of the housing and a spring 124 urging the spool 123 toward the spool 122, i.e., downwardly in the figure. The spool 122 has two lands 122a and 122b respectively of smaller and larger diameter. The spool 123 is also provided with a land 123d of the largest diameter, lands 123b and 123c of a medium large diameter and a land 123a of the smallest diameter which is yet larger than the diameter of the land 122b of the spool 122. The housing is provided with ports 193, 195, 197, 199, 201, 202, 203, 204 and 205 and also with chambers 194, 196, 198, 200, and 206.

The ports 199 and 203 constitute exhaust ports in connection with the reservoir 50, and the port 193 is connected to a port 176 of the manual selector valve 102 through a conduit 68. The ports 195 and 205 are in connection with a port 177 of the manual selector valve 102 through a conduit 69 which is connected to a branch conduit 69a and a conduit 69b. The port 197 is connected to the conduit 73 which bifurcates into the two branch conduits 73a and 73b respectively in connection with the ports 217 and 215 of the 2-3 shift valve 107. The chamber 200 is a mere groove made for convenience for completing the cylindrical bore on the housing. The port 201 is connected to the port 173 of the manual selector valve 102 through a conduit 63b and the conduit 63 which is further in communication with the conduit 63a extending to an actuating pressure chamber 231 of the servomotor for the front clutch 8. the port 202 is connected to a port 207 of the actuating pressure chamber 236 of the servomotor for the front bake 10 through a conduit 72. The port 204 is in connection with a port 240 of the pressure chamber 242 of the servomotor for the rear brake 11 through a conduit 71.

The reducing valve 108 comprises a housing provided with a cylindrical bore therein, a spool 131 having lands 131a and 131b of a diameter and a spring 132 urging the spool 131 downward in FIG. 3C. The housing includes ports 225, 227, 228 and 230 and also chambers 226 and 229. The port 225 is connected to the conduit 69 through a conduit 69c. The port 227 is in communication with the conduit 59 which extends to the port 163 of a reducing chamber 164 of the pressure regulator valve 103. The port 228 is connected to the conduit 72 through a conduit 72a and the port 230 to the conduit 71 through a conduit 71a.

The manual selector valve 102 is provided with the six positions of "P" or Parking Brake, "R" or Reverse, "N" or Neutral, "D" or Drive Range, "2" or Second Range, and "L" or Low Range for conditioning the transmission to the selected speed ratio power train through the manual selector lever in the cab of the vehicle. The manual selector value 102 comprises a housing including a cylindrical bore therein and a spool 114 slidably engaged within the cylindrical bore. The spool has lands 114a, 114b, 114c and 114d of a diameter and also a connection portion 114e to have the spool 114 connected to the manual selector lever through suitable connecting means. The housing includes a plurality of ports 171 through 179. The ports 171 and 179 constitute exhaust ports in connection with the reservoir 50.

As will be well recalled, the ports 171 through 179 and the conduits connected therewith are arranged as described below. The port 172 is connected to the conduit 74 which is in turn connected to the port 220 of the 2-3 shift valve 107. The port 173 is in connection with the conduit 63 which extends in one direction to the branch conduits 63c and 63d respectively in connection with the ports 182 and 186 of the throttle valve 104, and in the other direction to conduits 63a and 63b respectively leading to the actuating pressure chamber 231 of the servomotor for the front clutch 8 and to the port 201 of the 1-2 shift valve 105. The ports 174 and 175 are connected to the line pressure conduit 57 respectively through branch conduits 57a and 57b. The port 176 is connected through the conduit 68 to the chamber 194 through the port 193 of the 1-2 shift valve 105. The port 177 is in communication with the conduit 69 which further is connected to the ports 195 and 205 of the 1-2 shift valve 105 through the branch conduit 69a and the conduit 69b, the conduit 69 also connected to the conduit 69c extending to the port 225 of the reducing valve 108. The port 178 is connected to the port 223 of the 2-3 shift valve 107 through the conduit 70 extending to the port 157 of the pressure regulator valve 103 through the conduit 70a.

Now in operation, the vehicle driver keeps the transmission and the hydraulic control system therefor under his control by means of the accelerator 25 and the manual selector lever. The pressure regulator valve 103 functions to constantly adjust and hold the line pressure within the line pressure conduits 57 and conduits connected therewith at a predetermined value covering all the speed ratio conditions of the transmission and the hydraulic control system therefor. While the vehicle stops with the engine 5 thereof kept idling or runs at a low speed, the front pump 100 works as the source of fluid pressure for the pressure regulator valve 103 and other mechanisms. The check valve 109 is kept open by the fluid pressure within a branch conduit 53b and the fluid pressure within the line pressure conduit 57 keeps the check valve 110 closed as illustrated in FIGS. 3A and 3D. This prevents the pressurized fluid in the line pressure conduit 57 from flowing into the rear pump 101. The rear pump 101 which is as recalled driven by the driven shaft 2 starts operating when the vehicle starts moving, and at and above a certain speed of the vehicle the rear pump 101 produces such fluid pressure as to overcome the total thrusting force of the fluid pressure within the line pressure conduit 57 and the biasing force of the spring 136 disposed within the check valve 110. This opens the check valve 110 to allow a flow of fluid pressure toward the check valve 109 which is now accordingly closed. From this point, the rear pump 101 works as the only source of fluid pressure within the line pressure conduit 57. And the operation fluid discharged from the front pump 100 keeps going round in a circle circuit formed with the front pump 100, the outlet conduit 53, the branch conduit 53a, the ports 159 and 158 of the pressure regulator valve 103, the conduit 56 and the inlet conduit 52. Thus, no operation fluid pressure is now produced by the front pump 100.

The discharging amount of the front pump 100 is adjusted by the regulator valve 103 by means of the upper surface of a boss 208 provided on the wall of the cylindrical bore and the bottom surface of the land 45a of the spool 45. Meanwhile, the adjustment of the discharging amount of the rear pump 101 is realized by means of the upper surface of a boss 209 provided on the wall of the cylindrical bore of the regulator valve housing and the bottom surface of the land 45b of the spool 45. Consequently, the adjusted fluid pressure for the rear pump 101 is in general rather greater than that for the front pump 100.

The line pressure from the line pressure conduit 57 is then reduced by the orifice 170 provided in the port 160 of the regulator valve housing and delivered to the torque convertor 7 through the conduit 54. A conduit 55 connects the torque convertor 7 with a check valve 111 for lubrication circuits. The check valve 111 includes a spring 138 biasing a check ball 139 so as to close the conduit 55. The fluid pressure within the torque convertor 7 is, therefore, maintained constantly at a certain value. The check valve 111 is also provided with a port 212 for lubricating various operation portions of the transmission.

When the line pressure is supplied into the chamber 164 of the regulator valve 103, a fluid pressure acting on the difference between the areas of the lands 45c and 45d within a chamber 165 and a fluid pressure acting on the area of the land 45d within the chamber 164 get together to function as the reaction element against the spring 117. The chambers 164 and 165 are so arranged to keep the line pressure therein at a rather low value. In case the line pressure is eliminated from the chamber 164, however, the spring 117 has only a single reaction element of the fluid pressure acting on the difference between the area of the lands 45c and 45d within the chamber 165. Consequently, this makes the line pressure within the chamber 165 at a high value. Supply and discharge of the line pressure in and from the chamber 164 is controlled by the reducing valve 108.

The port 228 of the reducing valve 108 is connected to the port 202 of the 1-2 shift valve 105, and the governor valve 113 modulates the fluid pressure acting on the spool 251 gradually in response to the continuous changes of the centrifugal force of the weights 245 and 246. Thus, the governor pressure is obtained.

In any forward speed ratio condition of the transmission, the fluid pressure discharged from the rear pump 101 is supplied to the port 253 of the governor valve 113 through the discharging conduit 61, the conduit 62, the orifice 125 and the conduit 62a. The governor valve housing 243 rotates together with the driven shaft 2 and while the vehicle runs at a low speed, fluid pressure in response to differences among the inner weight 246, the outer weight 245 and the spool 251 acts upon the difference of the areas between the lands 251a and 251b. This fluid pressure increases in accordance with the increase of the rotation speed of the driven shaft 2.

As the vehicle increases its speed, the outer weight 245 is displaced outward by centrifugal force will it is seated on a snap ring 244. Consequently, the centrifugal force of the inner weight 246 and the resilient force of the spring 248 charged by the displacement of the outer weight 246 are in effect against the fluid pressure acting on the spool 251. In the way mentioned, the centrifugal force produced by the inner and outer weights 246 and 245 changes in two ranges, which in turn provides two ranges in the change of the governor pressure.

The depression of the accelerator 25 effects the spool 120 of the throttle valve 104 through the spool 118 of the downshift valve 26 to produce the throttle pressure within the conduit 64. The throttle pressure varies from almost non-pressure value to the full value of the line pressure in the line pressure conduit 57 in accordance with the depression of the accelerator 25. The line pressure within the line pressure conduit 63 flows into the throttle valve 104 through the branch conduit 63d and the port 186, and within the throttle valve 104, a fluid pressure is produced in response to the thrust force difference between the resilient force of the spring 119 and the total thrust force of the fluid pressure in a chamber 191 and the resilient force of the spring 121. This modulated fluid pressure is further delivered to the throttle pressure conduit 64 through the port 185. Then, the modulated throttle pressure leads to the chamber 214 of the 2-3 shift valve 107. The orifice 188 is provided within the branch conduit 64b to prevent undesired vibration and oscillation of the throttle valve 104.

Described below is the operation of the mentioned hydraulic control system in accordance with shifting the manual selector lever to its several positions which correspondingly determines the positions of the manual selector valve 102 to condition the transmission for the selected drive range.

The Neutral Range:

When the manual selector valve 102 is shifted into its "N" or Neutral Range position through the manual selector lever in the cab, the spool 114 of the manual selector valve 102 is positioned so as to close the ports 174 and 175 of the housing by means of the lands 114b and 114c provided thereon. This prevents the line pressure within the line pressure conduit 57 from flowing pressurized into the manual selector valve 102 through the branch conduits 57a and 57b which are respectively in connection with the ports 174 and 175. Thus, no fluid pressure is delivered to any of the valves and/or the servomotors for the frictional devices installed within the control system, which establishes and maintains the neutral condition for the transmission.

The Low Range:

The shifting of the manual selector valve 102 into its "L" or Low Range position moves the spool 114 so as to connect the line pressure conduit 57 with the ports 176 and 177 through the branch conduit 57b, the port 175 and a short cylindrical cavity formed between the lands 114b and 114c. And also the line pressure conduit 57 is connected with the port 173 through a branch conduit 57a, the port 174 and a short cylindrical cavity formed between the lands 114c and 114d. The line pressure from the port 176 is then sent pressurized into the chamber 194 of the 1–2 shift valve 105 through the conduit 68 and the port 193. The line pressure from the port 177 flows through the conduit 69 and reaches to the chamber 196 of the 1–2 shift valve 105 through the branch conduit 69a and the port 195, and also reaches to the port 205 through the conduit 69b.

The fluid pressure delivered into the chambers 194 and 196 pushes against urging force of the spring 124 the spools 122 and 123 of the 1–2 shift valve 105 upward in FIG. 3D. The upward movement of the spool 123 opens the port 204 to let the line pressure run into the actuating pressure chamber 242 of the servomotor for the rear brake 11 through the conduit 71 and the port 240 of the actuating pressure chamber 242. The line pressure is divided into four flows from the port 173 of the manual selector valve: a first flow runs through the conduits 63 and 63a to be delivered into the actuating pressure chamber 231 of the servomotor for the front clutch 8; a second flow leads through the conduits 63 and 63b to the port 201 of the 1–2 shift valve, the port 201 being now closed by means of the lands 123a and 123b of the spool 123 positioned upward within the cylindrical bore of the 1–2 shift valve housing, a third flow reaches the port 182 of the downshift valve through the conduit 63, the branch conduit 63c, the port 182 being normally closed by the land 118b of the spool 118 engaged slidably within the cylindrical bore of the downshift valve housing 26a; and a fourth flow is sent pressurized into a short cylindrical cavity formed by the lands 120a and 120c of the spool 120 inserted slidably into the cylindrical bore of the throttle valve housing by way of the conduit 63, the branch conduit 63d and the port 186 of the throttle valve.

Thus, in the throttle valve 104, fluid pressure occurs within the chamber 191 and the short cylindrical cavity formed between the lands 120a and 120c of the spool 120. The fluid pressure or now called as the throttle pressure is then sent into the chamber 214 of the 2–3 shift valve 107 through the port 185, the conduit 64, the check valve 112, the conduit 67 and the port 213 of the 2–3 shift valve. The throttle pressure within the chamber 214 pushes and maintains the spool 127 upward in FIG. 3C while the governor pressure is lower in the chamber 206, the chamber 214 being connected with the port 215. And the throttle pressure flows into the port 217 of the 2–3 shift valve through the branch conduits 73b and 73a to consequently have its value reduced by resilient force of the spring 128. The throttle pressure in the branch conduits 73a and 73b, the value of which is thus reduced and which is hereinafter designated as the adjusted throttle pressure, is further forwarded through the conduit 73 to the port 197 of the 1–2 shift valve, the port 197 opening to the chamber 198 in which the adjusted throttle pressure delivered helps to keep the spool 123 in the low speed position thereof.

As described above, the front clutch 8 and the rear brake 11 engaging, which holds the gear carrier 27 not to rotate, the transmission is conditioned for the low speed ratio power train. In this condition of the transmission, the one-way brake 29 works also to hold the gear carrier 27 not to rotate in one direction, or the direction of reaction force acting on the gear carrier 27, but allows the gear carrier 27 to rotate freely in the other direction; the one-way brake 29 thus provides one-way drive. Meanwhile, the rear brake 11 holds up entirely the gear carrier 27, providing two-way drive. These one-way and two-way drive operations of the one-way brake 29 and the rear brake 11 are necessary to obtain the desired engine braking effect in the low range drive of the vehicle.

The spools 122 and 123 of the 1–2 shift valve 105 are placed in the low speed position thereof, or upward in FIG. 3D, by the total pressure acting on the area difference between the lands 123c and 123d of the spool 123 and withing the chambers 198, 196 and 194, regardless of the value of the governor pressure in the chamber 206 which gives downward thrust force to the spools 122 and 123. Consequently, the low speed ratio power train through the transmission is maintained and not to be shifted to any other power train unless the manual selector lever is shifted from the "L" or Low Range position thereof.

When the manual selector valve 102 is placed in its "L" or Low Range position to drive the vehicle at a low speed, a line pressure passage becomes open, the passage running through the manual selector valve 102, the conduit 69, the conduit 69b, the 1–2 shift valve 105 and the conduit 71, and terminating at the rear brake 11 which then engages to help completion of the low speed ratio power train. Immediately after the shifting of the manual selector valve 102 to its "L" or Low Range position, however, an orifice 126 provided in the conduit 69b prevents rapid and full increase of the values of the fluid pressure within the conduits 71 and 71a, the chamber 229 of the reducing valve 108 and the actuating pressure chamber 242 of the servomotor for the rear brake 11. And prior to the full pressure increase in the mentioned portions, the fluid pressure in the conduit 69 and 69c and the chamber 226 of the reducing valve 108 increases up to the value of the line pressure. As the result, the spool 131 of the reducing valve 108 is moved upward in FIG. 3C against resilient force of the spring 132 so that the chamber 226 is connected with the port 227 and the line pressure delivered to the chamber 226 is supplied to the pressure reducing chamber 164 of the pressure regulator valve 103 through the conduit 59 and the port 163 of the regulator valve 103. This brings the value of the line pressure under control of the pressure regulator valve 103 lower by the value of the fluid pressure active within the pressure reducing chamber 164.

Then, after a predetermined period of time set for the operation of the orifice 126 passes, the effect of the orifice 126 to reduce the passing quantity of the operation fluid is lost and the fluid pressure within the conduits 71 and 71a, the actuating pressure chamber 242 of the servomotor for the rear brake 11 and the chamber 229 of the reducing valve 108 increases to be balanced against the line pressure within the chamber 226 of the reducing valve 108. Thus, when the rear brake 11 operates almost in its full engagement, the spring 132 provided in the reducing valve 108 urges the spool 131 down as illustrated in FIG. 3C. The connection between the ports 225 and 227 of the reducing valve 108 is shut out, the port 227 being in communication with the port 228. The fluid pressure in the pressure reducing chamber 164 of the regulator valve 103 is sent to the port 202 of the 1-2 shift valve 105 through the conduit 59, the ports 227 and 228 of the reducing valve 108, and the conduits 72a and 72, being finally drained out from the exhaust port 203 of the 1-2 shift valve 105. This brings back the fluid pressure under the control of the regulator valve 103 to the original high value.

FIG. 4 shows relative connections between the time lag in the above operation and the increasing ratio of the fluid pressure value in the servomotor for the rear brake 11. The "A" portion of the curve in the figure shows the increasing ratio of the pressure value in the pertaining conduits and chambers after the fluid pressure is regulated by the orifice 126. The "B" portion shows the curve in accordance with the changes of the resilient force of the spring 155 of the rear brake 11 as the spring 155 is being charged by the displacement of the piston 154. The jointing point of the "B" portion with the "C" portion indicates in the preferred embodiment the time when the piston 154 almost completes its displacement to let the brake band 32 of the rear brake 11 engage with the brake drum 28 at the same time the spool 131 of the reducing valve 108 is moved upward by the increased fluid pressure in the chamber 226 exceeding the total thrust force of the spring 132 and the pressure in the chamber 229. The "C" portion shows the slow increase of the fluid pressure in the pertaining portions disposed behind the orifice 126 in the circuit since the pressure regulator valve 103 controls the line pressure at a low value by means of the fluid pressure supplied into the pressure reducing chamber 164. At the right end of the "C" portion where the "D" portion is jointed, the pressure reducing effect of the orifice 126 is lost and the fluid pressure is balanced in the chambers 226 and 229 respectively provided at each end of the spool 131 of the reducing valve 108 and the spool 131 is pushed down by the spring 132 to consequently drain out the line pressure in the pressure reducing chamber 164 of the regulator valve 103 as has been described heretofore. Thus, the "D" portion shows the quick increase of the fluid pressure in the pertaining portions disposed behind the orifice 126 in the circuit after the value of the fluid pressure in the conduit 69 is raised to the high one. The portion indicated with "E" is in the same value of the fluid pressure as the high value of the line pressure.

The dotted line "F" shows the pressure increasing ratio in the actuating pressure chamber 242 of the servomotor for the rear brake 11 when the reducing valve 108 of the present invention is not provided within the hydraulic control system. The low value of the line pressure is approximately equal to the total force of the fluid pressure produced at the jointing point of the "C" portion with the "D" portion and the resilient force of the spring 132 provided within the reducing valve 108.

The Second Range:

When the manual selector valve 102 is shifted to its "2" or Second Range position by way of the manual selector lever, the spool 114 of the manual selector valve 102 moves to the corresponding position which places the land 114b of the spool 114 on a dividing portion 211 prepared on the wall of the cylindrical bore between the ports 177 and 176. And the connection between the two ports 177 and 176 is closed off, all other passages of the line pressure remaining as established for the "L" or Low Range drive, that is to say, the hydraulic circuit for the Second Range drive is same as that for the Low Range drive but with the line pressure eliminated from the conduit 69, the conduit 69b and the branch conduit 69a.

Accordingly, no pressure exists acting in the chamber 196 of the 1-2 shift valve 105 and on the area difference between the lands 123c and 123d of the spool 123, and the governor pressure in the chamber 206 when increased by the increase of the speed of the vehicle pushed the spool 122 and 123 to the high speed position thereof or downward in FIG. 3D. This lets the land 123a and 123b of the spool 123 open the port 201, which then leads the line pressure to the actuating pressure chamber 236 of the servomotor for the front brake 10 through a short cylindrical cavity formed between the lands 123b and 123c of the 1-2 shift valve 105, the port 202, the conduit 72 and the port 207 of the front brake 10.

As described above, in the Second Range drive, while the speed of the vehicle is low, the front clutch 8 and the one-way brake 29 engage and all other friction devices disengage, which completes the low speed ratio power train through the transmission. And at and above a certain speed of the vehicle when the 1-2 shift valve 105 is in its high speed position, the line pressure acts in the actuating pressure chambers 231 and 236 respectively of the front clutch 8 and the front brake 10 so as to complete the intermediate speed ratio power train through the transmission. While the transmission is conditioned to the low speed ratio power train in the Second Range drive, i.e. the vehicle runs below a certain speed which is low, no line pressure is delivered to the conduits 69 and 72 and accordingly no line pressure to the pressure reducing chamber 164 of the regulator valve 103. Consequently, the pressure controled by the regulator valve 103 is high in its value. Then, when the intermediate speed ratio power train is completed at and above a certain speed of the vehicle, the line pressure is supplied to the conduit 72 and the line pressure from the conduit 72 is lead to the pressure reducing chamber 164 of the regulator valve 103 through the conduit 72a, the reducing valve 108 and the conduit 59. Thus, the pressure controled by the regulator valve 103 becomes low in its value.

A kickdown operation of the transmission to switch the intermediate speed ratio power train to the low speed can be performed as described below. When the accelerator 25 is quickly depressed while the transmission is conditioned to the intermediate speed ratio power train, the adjusted throttle pressure in the chamber 198 of the 1-2 shift valve 105 is rapidly increased since the land 118b of the down-shift valve 26 moves rightward in FIG. 3B so as to connect the port 182 with the port 181, the line pressure from the port 173 of the manual selector valve consequently flowing into the chamber 198 of the 1-2 shift valve 105. On the other hand, the governor pressure in the chamber 206 makes little increase. The total force of the pressure in the chambers 198 and 194, thus, exceeds the thrusting force of the governor pressure and the spring 124 and pushes the spools 122 and 123 to the low speed position thereof or upward in FIG. 3D. This upward movement of the spools 122 and 123 closes the connection between the ports 201 and 202 by the land 123b of the spool 123. The port 202 is connected to the exhaust port 203 through a short cylindrical cavity formed between the lands 123b and 123c. This disengages the front brake 10 and the one-way brake 29 is in operation. The low speed ratio power train is then completed through the transmission. As the speed of the vehicle increases, the governor pressure in the chamber 206 increases, and when the governor pressure reaches a certain value which exceeds the upward thrusting force onto the spools 122 and 123, the spools 122 and 123 is urged down to the high speed position thereof to complete the intermediate speed ratio power train, the supply of fluid pressure into the chamber 198 being shut off by the land 123a. As has been described, in the Second Range drive, automatic speed shifting can be realized between the low and intermediate speed power trains through the transmission.

The Drive Range:

The manual shifting of the selector lever in the cab to its Drive Range position sets the manual selector valve 102 to the corresponding position thereof, so that the line pressure in the conduit 57 is lead to the conduit 74 through the port 174 of the manual selector valve, a short cylindrical cavity formed between the lands 114c and 114d of the spool 114 and the port 172. At the same time, the port 176 is closed to the port 175 by the land 114b of the spool 114 and is connected to the exhaust port 179. This drains out the pressure in the chamber 194 of the 1-2 shift valve 105 through the port 193, the conduit 68, the port 176, and the exhaust port 179. Excepting the mentioned, all the connections within the hydraulic control system remain as same as in case of the Second Range drive. The spools 122 and 124 of the 1-2 shift valve 105 are constantly urged down to the high speed position thereof by the spring 124 except the occasions when the transmission is conditioned to the low speed ratio power train by kickdown operation. The line pressure in the conduits 63 and 63b is, therefore, constantly supplied to the pressure reducing chamber 164 of the regulator valve 103 through the 1-2 shift valve 105, the conduit 72, the conduit 72a, the reducing valve 108 and the conduit 59. Thus, in the Drive Range drive, the line pressure under control of the regulator valve 103 is maintained in the low value while the transmission is conditioned to either of the high speed or intermediate speed ratio power train. The line pressure within the conduit 74 leads to the port 220 of the 2-3 shift valve 107, the port 220 being closed, while the speed of the vehicle is low, by the lands 129b and 129c of the spool 129 which is placed in the low speed position thereof or upward in FIG. 3C by the throttle pressure in the chamber 214 and the spring 128 since the governor pressure is low at the low speed of the vehicle. Thus, the front clutch 8 engages as well as the front brake 10 does to complete the intermediate speed ratio power train through the transmission.

The increase of the governor pressure in the chamber 206 in accordance with the increase of the vehicle speed will overcome the total force of the throttle pressure in the chamber 214 and the spring 128 in the 2-3 shift valve 107. Then, the spool 129 and 127 are urged downward in FIG. 3C or to the high speed position thereof. The line pressure from the conduit 74 flows through the port 220, a short cylindrical cavity formed between the lands 129c and 129d of the spool 129, the port 222, and the conduit 75 where the flow of the line pressure is bifurcated into the branch conduits 75a and 75b. Through the branch conduit 75a, the pressure leads into the actuating pressure chamber 234 of the servomotor for the rear clutch 9 which is then engaged, and through the branch conduit 75b, the pressure is supplied into the releasing pressure chamber 239 of the servomotor for the front brake 10 which is then disengaged. Thus, the high speed ratio power train is established through transmission.

As mentioned above, in the Drive Range drive, automatic shifting from the intermediate speed ratio power train to the high speed ratio power train is made as the vehicle speed changes from the low to the high, and automatic shifting of the two power trains in the reverse way is realized when the vehicle speed decreases.

Described below is the kickdown operation in the Drive Range drive.

When the accelerator 25 is quickly depressed while the vehicle runs below a certain speed, for instance 40 km/h, with the transmission conditioned to the intermediate speed power train in the Drive Range drive, the adjusted throttle pressure in the chamber 198 of the 1-2 shift valve 105 is rapidly increased through the some process as explained in the Second Range drive. This increased pressure pushed the spool 123 upward in FIG. 3D or to the low speed position thereof overcoming the total thrust force of the governor pressure in the chamber 206 and the spring 124. The connection between the conduits 63b and 72 is closed off, the engaging pressure for the front brake 10 drained out from the outlet port 203 of the 1-2 shift valve 105. Then, among the friction devices of the hydraulic control system, the front clutch 8 and the one-way clutch 29 are in the frictional engagement thereof. This completes the low speed ratio power train through the transmission. The line pressure is eliminated from the conduit 72 and no pressure is in the pressure reducing chamber 164 of the regulator valve 103, the pressure under control of the regulator valve 103 being thus at its high value.

The accelerator 25 is quickly depressed while the vehicle runs below a certain speed, for instance 80 km/h with the transmission in the high speed ratio power train condition, in response to the degree of the depression of the accelerator 25 which means the throttle pressure, the spool 129 of the 2-3 shift valve 107 is urged to the low speed position thereof by the throttle pressure against the governor pressure in the chamber 206. Then, the intermediate speed ratio power train is completed. And when the throttle pressure is higher and the speed of the vehicle is lower, the throttle pressure urges the spool 123 of the 1-2 shift valve 105 to the low speed position thereof against the total thrust force of the spring 124 and the governor pressure in the chamber 206, the spool 129 of the 2-3 shift valve 107 remaining in the low speed position thereof. Thus, the low speed ratio power train is completed through the transmission. In brief, the speed ratio train can be kicked down from the high to either of the intermediate or the low in accordance with the degree of the depression of the accelerator 25 and the speed of the vehicle.

Manual Downshift:

The transmission in the present invention is capable of being manually downshifted to the intermediate or low speed ratio power train from the high speed power train in the Drive Range drive by shifting the manual selector lever to the Second Range or Low Range position. And it is also possible with the transmission that the power train is shifted down to the low speed ratio from the intermediate ratio in the Second Range drive by shifting the manual lever to the Low Range position. The low speed ratio power train will, however, not be completed when the manual lever is shifted down to the Low Range position from either of the Drive or the Second Range position in order to manually condition the transmission to the low speed ratio power train while the vehicle runs above a certain one.

In this case, the overrun of the engine 5 may not be controlled as desired, then the transmission is regulated not to be shifted to the low speed ratio power train. When the downshift operation is made to effect engine brake by manual shifting of the manual selector lever to the Low Range position thereof while the transmission is conditioned to the intermediate or high speed ratio power train in the Drive Range or the Second Range drive, the accelerator 25 is in general released once to close the throttle valve 104. Then the adjusted throttle pressure becomes zero or almost zero at most in the chamber 198 of the 1–2 shift valve 105. Only the line pressure in the chambers 194 and 196 is the reaction force against the total force of the governor pressure in the chamber 206 and the resilient force of the spring 124, the pressure in the chambers 194 and 196 being equal to the product of the area of the land 122b of the spool 122 and the line pressure. While the total force of the governor pressure in the chamber 206 and the spring 124 exceeds the pressure in the chambers 194 and 196, in other words while the vehicle runs above a certain speed, no downshift operation is completed and the Second Range drive is kept for the hydraulic control system. And when the governor pressure in the chamber 206 decreases in accordance with the decrease of the vehicle speed, the spools 122 and 123 of the 1–2 shift valve are urged to the low speed position thereof so as to complete the low speed ratio power train through the transmission.

Reverse Drive:

When the manual selector valve 102 is set to its Reverse position by the manual selector lever, the line pressure is lead to the chamber 194 of the 1–2 shift valve 105 through the port 176 of the manual selector valve 102, the conduit 68 and the port 193 of the 1–2 shift valve 105. At the same time, the line pressure is also supplied into the chamber 196 of the 1–2 shift valve 105 through the port 177 of the manual selector valve 102, the conduit 69, the branch conduit 69a and the port 195 of the 1–2 shift valve 105. As previously described, the pressures delivered in the chambers 194 and 196 urges the spools 122 and 123 to the low speed position thereof. The line pressure is also delivered to the actuating pressure chamber 242 of the servomotor for the rear brake 11 through the port 177 of the manual selector valve 102, the conduit 69, the conduit 69b, the ports 205 and 204 of the 1–2 shift valve 105, the conduit 71 and the port 240 of the rear brake 11. The rear brake 11 then engages.

Another flow of the line pressure runs through the port 178 of the manual selector valve 102, the conduit 70, the port 223 of the 2–3 shift valve 107, a short cylindrical cavity formed between the lands 129c and 129d of the spool 129, the port 222 and the conduit 75, and then through the branch conduit 75a, the pressure is supplied in the actuating pressure chamber 234 of the servomotor for the rear clutch 9 and through the branch conduit 75b, the pressure is also supplied in the releasing pressure chamber 239 of the servomotor for the front brake 10. Thus, the rear clutch 9 engages and the front brake 10 disengages. At this moment, the front clutch 8 disengages since the actuating pressure chamber 231 of the servomotor therefor is in connection with the exhaust port 171 of the manual selector valve 102 through the conduits 63a and 63 and the port 173 of the manual selector valve 102. The engagement of the rear brake 11 and the rear clutch 9 completes the power train for the reverse drive through the transmission.

In the reverse drive ratio power train, such a pressure passage is prepared to keep the line pressure at a high value as to run and reach the chamber 168 of the regulator valve 103 through the port 178 of the manual selector valve 102, the conduits 70 and 70a, the port 157 of the regulator valve 103. An orifice 115 provided within the conduit 70a has, however, such effect to prevent the rapid pressure increase in the chamber 168 of the regulator valve 103 before the rear clutch 9 engages. This makes the fluid pressure in the actuating pressure chamber 242 to engage the rear brake 11 increase in accordance with the "A", "B", "C", "D" and "E" portions in FIG. 4 as in the case of the Low Range drive. When the fluid pressure in the actuating pressure chamber 242 of the servomotor for the rear brake 11 increases enough, the fluid pressure in the pressure reducing chamber 164 of the regulator valve 103 is eliminated and on the other hand the fluid pressure in the chamber 168 is increased, so that the line pressure under control of the regulator valve 103 becomes higher than that for the forward drive. This large line pressure is required to operate the rear clutch 9 and brake 11 to transmit the large torque produced in the reverse speed ratio power train.

In the reverse drive, the driven shaft 2 rotates in the reverse way, the rear pump 101 being kept inoperative. Thus, no pressure is lead to the conduits 61 and 62, which in turn keeps the governor valve 113 inoperative so as not to produce the governor pressure. The governor pressure in the chamber 206 is zero, and then, in the 1–2 shift valve 105 the spring 124 only produces the downward thrust force, accordingly the spools 122 and 123 being placed always in the low speed position thereof. And in the 2–3 shift valve 107, there is no downward thrust force, the spool 129 being urged to its low speed position by the spring 128.

As has been fully explained, the transmission in the present invention is so designed as to have a low but enough line pressure to complete the intermediate and high speed ratio power trains and a high line pressure to complete the low speed ratio power train in both automatic and manual selection of one desired power train, and to be capable of lessening much the shocks produced in engaging operation of the pertaining friction devices in shifting the manual selection lever to the Low Range position from other positions and in shifting the manual selector lever to the Low Range position while the transmission is conditioned to the high or intermediate ratio power train by means of the slow increase of the fluid pressure in the servomotors for the pertaining friction devices.

The preferred embodiment refers to a transmission provided with three forward speed drives and one reverse drive, but it should be clear that a slight modification enables the adoption of the present invention onto any type of transmission provided with several forward speed drives and several reverse drives. And yet it is to be understood that various other changes and modifications may be resorted to without departing from the spirit and scope of the appended claims.

What is claimed is:

1. An hydraulic control system for the transmission of an automotive vehicle having a driving engine comprising in combination, a drive shaft adapted to be driven by the engine; a driven shaft adapted to drive the vehicle, means for providing multi-ratio power trains between said drive shaft and driven shaft and having friction engaging mechanisms including fluid pressure actuated servo-means for engagement thereof for completing said power trains when engaged, a source of fluid pressure, a line pressure conduit for connecting said pressure source to said servo-means, pressure regulating valve means including a pressure reducing chamber for controlling line pressure within said conduit to and from a predetermined high valve and a predetermined low value respectively, manual selector valve means disposed between said pressure regulating valve means and said servo-means for selectively connecting said line pressure conduit to said servo-means, flow regulating means interposed between the said selector valve means and said servo-means for regulating fluid pressure supplied into said servo-means, and sensing means for comparing the pressures in said line pressure conduit and servo-means, said sensing means including a housing, a spool valve defining a bore of said housing into a first pressure chamber connected to both said servo-means and said flow regulating means and a second pressure chamber normally connected to said line pressure conduit through said selector valve means, and a resilient member disposed within said first chamber, said second chamber being selectively connected to said pressure reducing chamber of the regulating valve means when said spool valve operates because of the difference between fluid pressure within said second pressure chamber and the total pressure produced by said resilient member and fluid pressure within said first chamber, whereby as said line pressure is applied to said servo-means through said selector valve means and said flow regulating means and to said second pressure chamber of said sensing means, said spool valve starts operation to lead line pressure into said pressure reducing chamber so as to cause said pressure regulating valve means to control said line pressure down to a low value, and to return the line pressure of low value to a high value as the line pressure supplied into said servo-means reaches a predetermined value.

2. An hydraulic control system as claimed in claim 1, wherein is further provided an accelerator for controlling a throttle of said engine, throttle valve means interposed within said line pressure conduit through said manual selector valve means and connected with said accelerator, said throttle valve means providing a throttle pressure that varies in accordance with the opening of said throttle by said accelerator, an hydraulic governor driven by said driven shaft and connected with said line pressure conduit and providing a governor pressure that varies in response to the speed of the rotation of said driven shaft, shift valve means controlled by said throttle pressure and said governor pressure for applying said line pressure selectively to said servo-means through said flow regulating means.

3. An hydraulic control system as claimed in claim 1, wherein said friction engaging mechanism has friction clutch means and brake means, fluid pressure being supplied into said servo-means for said brake means through said flow regulating means, and said line pressure being supplied into said second pressure chamber of said sensing means through said selector valve means to control operation of the spool valve of said sensing means.

4. An hydraulic control system as claimed in claim 1, wherein said friction engaging mechanism comprises a first fluid pressure actuated servo-means for a relatively low speed and a second fluid pressure actuated servo-means for a high speed, and said sensing means comprises a first port connected to said line pressure conduit through said selector valve means, a second port connected to said pressure reducing chamber of said pressure regulating valve means, a third port connected to said first servo-means and said flow regulating means, and a fourth port connected to said second servo-means, whereby as line pressure is supplied to said first port and to said first servo-means through said flow regulating means, said spool valve of the sensing means is moved to establish communication between said first and second ports so that the line pressure is reduced to a low value by said pressure regulating valve means, and then as a predetermined pressure regulated by said flow regulating means is applied to said third port and said first servo-means, said spool valve is moved to block communication between said first and second ports.

5. An hudraulic control system as claimed in claim 1, wherein said resilient member installed in said sensing means is a coiled compression spring effective to determine a starting time of operation of said pressure regulating valve means.

6. An hydraulic control system as claimed in claim 1, wherein said flow regulating means is an orifice.

* * * * *